United States Patent
Kang et al.

(10) Patent No.: US 11,312,805 B2
(45) Date of Patent: *Apr. 26, 2022

(54) HYDROCARBON RESIN PRODUCTION METHOD

(71) Applicant: HANWHA SOLUTIONS CORPORATION, Seoul (KR)

(72) Inventors: Hyeonuk Kang, Daejeon (KR); Pilje Seong, Daejeon (KR); Kyongjun Yoon, Daejeon (KR); Heejin Jang, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/973,524

(22) PCT Filed: May 14, 2019

(86) PCT No.: PCT/KR2019/005768
§ 371 (c)(1),
(2) Date: Dec. 9, 2020

(87) PCT Pub. No.: WO2019/240387
PCT Pub. Date: Dec. 19, 2019

(65) Prior Publication Data
US 2021/0238331 A1    Aug. 5, 2021

(30) Foreign Application Priority Data
Jun. 11, 2018 (KR) .................. 10-2018-0066718

(51) Int. Cl.
| C08F 2/00 | (2006.01) |
| C08F 32/08 | (2006.01) |
| C08F 36/04 | (2006.01) |
| C08F 236/04 | (2006.01) |
| C08F 210/14 | (2006.01) |

(52) U.S. Cl.
CPC ........ *C08F 236/045* (2013.01); *C08F 210/14* (2013.01); *C08F 2/001* (2013.01); *C08F 32/08* (2013.01); *C08F 36/045* (2013.01)

(58) Field of Classification Search
None
See application file for complete search history.

(56) References Cited

U.S. PATENT DOCUMENTS 10,961,337 B2 * 3/2021 Kang .................. C09J 145/00

FOREIGN PATENT DOCUMENTS

| JP | 07086132 B2 | 9/1995 | |
| JP | 2004238430 A | 8/2004 | |
| KR | 100354307 B1 | 12/2002 | |
| KR | 100362002 B1 | 2/2003 | |
| KR | 20140126175 A | 10/2014 | |
| TW | 336237 B | 7/1998 | |
| WO | WO-2018110918 A1 * | 6/2018 | ............ C08F 8/06 |

OTHER PUBLICATIONS

International Search Report dated Aug. 14, 2019.

* cited by examiner

*Primary Examiner* — Richard A Huhn
(74) *Attorney, Agent, or Firm* — Harvest IP Law, LLP

(57) ABSTRACT

The present invention relates to a hydrocarbon resin production method comprising thermal polymerization under non-catalytic conditions, thereby enabling a narrow molecular weight distribution and the realization of uniform physical properties. Specifically, the present invention relates to a hydrocarbon resin production method and a hydrocarbon resin produced thereby, the method comprising thermal polymerization without a catalyst and an initiator, thereby enabling, by a low polydispersity index, a narrow molecular weight distribution, and thus a hydrocarbon resin having uniform physical properties.

11 Claims, No Drawings

HYDROCARBON RESIN PRODUCTION METHOD

CROSS-REFERENCE TO RELATED APPLICATIONS

This application is a National Stage of International Application No. PCT/KR2019/005768 filed May 14, 2019, claiming priority based on Korean Patent Application No. 10-2018-0066718 filed Jun. 11, 2018.

TECHNICAL FIELD

The present invention relates to a method for producing a hydrocarbon resin having uniform physical properties due to a narrow molecular weight distribution caused by a low polydispersity index by performing a thermal polymerization without a catalyst and an initiator, and a hydrocarbon resin produced therefrom.

BACKGROUND ART

A hydrocarbon resin is a typical tackifier or adhesive, and is mainly used as a material that imparts tackiness or adhesiveness to products such as an adhesive tape, paint, ink, rubber, a tire, or the like. The hydrocarbon resin may be in the form of liquid or solid at a room temperature, and may be in various forms, from transparent semi-fluid liquid to pale yellow and clear colorless solid.

A hydrocarbon resin produced by heating in the presence of a catalyst may cause various corrosion problems during hydrogenation due to the catalyst. In addition, the hydrocarbon resin thus produced has disadvantages that an activity of a hydrogenation catalyst is lowered and hydrogenation is not smoothly performed due to a metal of a polymerization catalyst. Further, the hydrocarbon resin thus produced has significantly low productivity due to low yield.

In order to solve the above described problems, it has been attempted to perform thermal polymerization without using a catalyst, and as a result, polymerization is performed under ordinary non-catalyst and non-initiator conditions, thereby improving yield and solving the problems of residual metals. However, a molecular weight distribution of a hydrocarbon resin is not uniform, and thus physical properties thereof are not constant.

DISCLOSURE

Technical Problem

In order to solve the problems as described above, the present inventors have conducted an extensive study on a method for producing a hydrocarbon resin having not only excellent yield but also uniform physical properties due to a narrow molecular weight distribution, and thus the present invention has been completed.

An embodiment of the present invention is directed to providing a method for producing a non-catalytic thermal polymerization hydrocarbon resin capable of preventing surface contamination such as a release of low molecular weight organic substances even after the hydrogenation.

Technical Solution

In one general aspect, a method for producing a hydrocarbon resin includes: a) a step of performing a primary thermal polymerization on a primary polymer of the hydrocarbon resin in a continuous stirred tank reactor (CSTR) under non-catalytic conditions; and b) a step of performing a secondary thermal polymerization on the primary polymer in a plug flow reactor (PFR) under non-catalytic conditions.

A reaction temperature ($T_1$) in the step a) may be 210 to 270° C., and a reaction temperature ($T_2$) in the step b) may be 180 to 300° C.

The reaction temperature ($T_2$) in the step b) may be the reaction temperature ($T_1$) in the step a) ±30°.

A reaction time in the step a) may be 10 to 180 minutes, and a reaction time in the step b) may be 10 to 360 minutes.

An internal volume of the plug flow reactor may be 1 to 3 times the internal volume of the continuous stirred tank reactor.

The plug flow reactor may be connected in series with the continuous stirred tank reactor.

The hydrocarbon resin may have a polydispersity index (PDI) of 2.5 or less.

The method may further include, after the step b), performing a hydrogenation process.

In another general aspect, there is provided a hydrocarbon resin produced by the method as described above.

The hydrocarbon resin may have a number average molecular weight of 200 to 1,200 g/mol, a weight average molecular weight of 250 to 4,000 g/mol, and a Z-average molecular weight (Mz) of 300 to 5,000 g/mol.

The hydrocarbon resin may have a polydispersity index (PDI) of 2.5 or less.

Advantageous Effects

The method for producing the hydrocarbon resin according to the present invention may provide the hydrocarbon resin having excellent molecular weight and a narrow molecular weight distribution during continuous polymerization by thermally polymerizing under non-catalyst and non-initiator conditions, through one-stage polymerization in a continuous stirred tank reactor (CSTR) and two-stage polymerization in a plug flow reactor (PFR), without using a catalyst or an initiator, to suppress an excessive crosslinking reaction.

BEST MODE

Hereinafter, a method for producing a hydrocarbon resin according to the present invention will be described in more detail with reference to the exemplary embodiments. The following exemplary embodiments are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined. The terms used herein are only for effectively describing a certain exemplary embodiment, and not intended to limit the present invention.

The present invention for achieving the above object relates to a method for producing a non-catalytic and non-initiator thermal polymerization hydrocarbon resin capable of implementing uniform physical properties, and a hydrocarbon resin produced from the method.

The present invention will be described in detail as follows.

A method for producing a hydrocarbon resin according to the present invention includes: a) a step of performing a primary thermal polymerization on a primary polymer of a hydrocarbon resin in a continuous stirred tank reactor (CSTR) under non-catalytic conditions; and b) a step of performing a secondary thermal polymerization on the primary polymer in a plug flow reactor (PFR) under non-catalytic conditions.

Specifically, the method for producing the hydrocarbon resin according to the present invention is performed in two steps. Reactants not containing a catalyst and an initiator are first subjected to the primary thermal polymerization in the continuous stirred tank reactor (CSTR). Then, a primary polymer produced from the above step is fed into the plug flow reactor (PFR) connected to the continuous stirred tank reactor and subjected to the secondary thermal polymerization to produce a hydrocarbon resin. Since the hydrocarbon resin is produced by the polymerization in each step as described above, the hydrocarbon resin capable of easily controlling the heat of polymerization, having a significantly improved conversion rate or a polymerization rate of a monomer, and uniform physical properties due to a narrow molecular weight distribution may be produced.

Among the conventional methods for producing the hydrocarbon resin, a non-catalytic thermal polymerization method had a limitation that the molecular weight distribution is typically broad, such that the uniform physical properties of the hydrocarbon resin are not provided. However, in the present invention, it is possible to provide the hydrocarbon resin which may be adjusted to have a narrow molecular weight distribution by adopting a process performed in the continuous stirred tank reactor (CSTR) and the plug flow reactor (PFR) as described above, thereby implementing significant effects such as uniform physical properties and prevention of contamination against an increase in implementation due to use for a long period of time when the hydrocarbon resin is used as an adhesive.

According to an aspect of the present invention, the method for producing the hydrocarbon resin includes a step of producing a primary polymer by supplying the monomer composition containing a monomer and a solvent to the continuous stirred tank reactor and performing primary thermal polymerization on the monomer composition while stirring the monomer composition, wherein the polymerization is performed by thermal polymerization alone without the use of any initiator or catalyst.

The terms "non-catalyst" and "non-initiator" used herein are concepts that do not include all of a metal catalyst, a cationic catalyst, or an anionic catalyst which artificially acts as a catalyst, or a peroxide initiator, an azo-based initiator, or a redox catalyst which artificially induces radical polymerization.

According to an aspect of the present invention, the continuous stirred tank reactor is not particularly limited as long as it is commonly used in the art to which the present invention pertains. Also, the polymerization may be performed with continuous charging and mixing of the monomer composition in the continuous stirred tank reactor. The monomer composition may be subjected to the primary thermal polymerization in the continuous stirred tank reactor as described above to maintain temperature uniformly when the reaction proceeds, and thus the probability of occurrence of a local hot spot is lowered, thereby having a narrow molecular weight distribution.

According to an aspect of the present invention, a reaction temperature ($T_1$) in the step a) may be 210 to 270° C., and preferably 220 to 270° C. When the polymerization is performed at the reaction temperature as described above, a conversion rate or a polymerization rate of the monomer is excellent, and the generation of side reactions such as a crosslinking reaction is suppressed, such that uniform physical properties may be implemented due to a narrow molecular weight distribution caused by a low polydispersity index.

According to an aspect of the present invention, a reaction pressure in the step a) may be 1 to 40 bar, preferably 5 to 35 bar, and more preferably 10 to 30 bar. When the polymerization is performed at the reaction pressure as described above, reactivity of the monomer may be increased to within a range at which the risk of safety accidents does not occur.

According to an aspect of the present invention, a reaction time in the step a) may be 10 to 180 minutes, preferably 20 to 150 minutes, and more preferably 30 to 100 minutes. When the polymerization is performed during the reaction time as described above, side reactions by mixing of raw materials may be suppressed and the narrow molecular weight distribution may be provided.

According to an aspect of the present invention, the polymerization may be performed until a monomer conversion rate of the monomer composition in the step a) is 5 to 70%, preferably 10 to 60%, and more preferably 15 to 50%. When the primary thermal polymerization is performed so as to have the conversion rate as described above, the yield of the polymer during the secondary thermal polymerization may be significantly increased and the occurrence of channeling or dead zone may be prevented, thereby improving polymerization efficiency.

According to an aspect of the present invention, the method for producing the hydrocarbon resin includes, after the primary thermal polymerization, a step of producing the hydrocarbon resin by supplying a primary polymer which is subjected to the primary thermal polymerization to the plug flow reactor, and then performing secondary thermal polymerization on the primary polymer without stirring. In this case, the plug flow reactor may be connected to the continuous stirred tank reactor in which the primary thermal polymerization is performed, from which the polymer may be supplied to perform the continuous polymerization.

When the thermal polymerization is performed only in the continuous stirred tank reactor, channeling by fluid containing unreacted materials and products is generated in the reactor to reduce polymerization rate and efficiency, and a polymer having nonuniform physical properties may be produced.

In addition, when the thermal polymerization is performed only in the plug flow reactor, the polymerization is necessarily performed under reaction conditions of high temperature and high pressure, and there is an advantage that the conversion rate of the monomer per unit volume of the reactor is high because the plug flow reactor has no stirring device inside. However, stirring may be insufficient, resulting in occurrence of a local hot spot and side reactions.

The monomer composition according to the present invention is not initially charged into the plug flow reactor and thermally polymerized, and is subjected to the primary thermal polymerization in the continuous stirred tank reactor, followed by secondary thermal polymerization of the reaction product which is polymerized to a certain level. As a result, the occurrence of a local hot spot may be suppressed due to the decrease of the heat of polymerization, and a narrow molecular weight distribution may be obtained, whereby a hydrocarbon resin having uniform physical properties may be produced.

In addition, according to an aspect of the present invention, it is possible to easily adjust the total volume of the reactor depending on the amount of production required by connecting the plug flow reactor in series with the continuous stirred tank reactor, without increasing the size of the continuous stirred tank reactor in existing facilities, thereby achieving a better economic effect. Further, with the use of the reactor having the configuration as described above according to the present invention, it is possible to more easily control the heat of polymerization and to produce a hydrocarbon resin having a narrow molecular weight distribution and uniform physical properties.

According to an aspect of the present invention, the plug flow reactor is not particularly limited as long as it is commonly used in the art to which the present invention pertains, and may be connected in series with the continuous stirred tank reactor. Also, continuous polymerization may be performed together with continuous charging of a primary polymer which is subjected to the primary thermal polymerization in the plug flow reactor.

According to an aspect of the present invention, a reaction temperature (12) in the step b) may be 180 to 300° C., preferably 180 to 290° C., and more preferably 180 to 280° C. More specifically, the reaction temperature (12) in the step b) may be the reaction temperature ($T_1$) in the step a) ±30° C., preferably the reaction temperature ($T_1$) in the step a) ±20° C., and more preferably the reaction temperature ($T_1$) in the step a) ±10° C. That is, 12 may be $T_1$−30° C. to $T_1$+30° C., preferably $T_1$−20° C. to $T_1$+20° C., and more preferably $T_1$−10° C. to $T_1$+10° C. When the polymerization is performed at the reaction temperature, side reactions may be suppressed and productivity may be increased.

In addition, like the reaction temperatures as described above, the difference in temperature between the step a) and the step b) is adjusted to 10 to 30° C. Thus, a hydrocarbon resin capable of minimizing the production of an unreacted oligomer, having a high softening point and a narrow molecular weight distribution may be produced.

According to an aspect of the present invention, the reaction pressure in the step b) may be 1 to 40 bar, preferably 5 to 35 bar, and more preferably 10 to 30 bar. When the polymerization is performed at the reaction pressure as described above, the occurrence of dead zone may be suppressed by vaporized monomers within a range at which the risk of safety accidents does not occur.

According to an aspect of the present invention, the reaction time in the step b) may be 10 to 360 minutes, preferably 20 to 240 minutes, and more preferably 30 to 140 minutes. More specifically, the reaction time in the step b) may be 1 to 4 times, preferably 1 to 3 times, and more preferably 1 to 2 times the reaction time in the step a). When the polymerization is performed during the reaction time as described above, side reactions are suppressed, whereby a hydrocarbon resin having the narrow molecular weight distribution may be produced.

According to an aspect of the present invention, an internal volume of the plug flow reactor may be 1 to 3 times, preferably 1 to 2.5 times, and more preferably 1 to 2 times the internal volume of the continuous stirred tank reactor. When the internal volume of the plug flow reactor has the size as described above with respect to the internal volume of the continuous stirred tank reactor, the control of an initial reaction heat is easy, such that the generation of impurities may be suppressed, and the polymerization efficiency may be increased, and at the same time, uniform physical properties may be implemented by controlling the reaction temperature.

According to an aspect of the present invention, the plug flow reactor may be connected in series with static mixers, which are any one or two or more selected from a kenics mixer and a sulzer mixer. The mixers as described above may be included to prevent the pressure drop in the reactor due to the flow of the solution with large viscosity.

According to an aspect of the present invention, a filter may further be included in a connection section between the continuous stirred tank reactor (CSTR) and the plug flow reactor (PFR). The filter may be made of any one or a mixture of two or more selected from metals, polymers and ceramics. The filter may have a pore size of 100 nm to 10 µm, preferably 100 nm to 1 µm, and is not particularly limited as long as it is a filter capable of filtering foreign substances, or the like.

According to an aspect of the present invention, the method for producing the hydrocarbon resin may perform a solvent separation process. In order to perform the solvent separation process as described above, a solvent separator may be connected to the plug flow reactor, and the solvent may be effectively discharged to recover a bulk phase hydrocarbon resin, thereby obtaining a granulated hydrocarbon resin.

According to an aspect of the present invention, in the method for producing the hydrocarbon resin, the monomer composition may be subjected to thermal polymerization in two steps under non-catalytic and non-initiator conditions in spite of a relatively short reaction time to have a high yield of 50% or more, preferably 60% or more, and more preferably 65% or more, and exhibit a narrow molecular weight distribution.

According to an aspect of the present invention, the monomer composition may include a monomer and a solvent. The monomer composition is subjected to the primary thermal polymerization together with charging and mixing while stirring in a continuous stirred tank reactor in step a). Then, in step b), a reaction product obtained from the step a) is subjected to the secondary thermal polymerization without stirring to suppress side reactions such as production of homopolymer, whereby a high-quality hydrocarbon resin having a low molecular weight distribution may be obtained.

According to an aspect of the present invention, the monomer may be any one or a mixture of two or more selected from a $C_2$-$C_{20}$ aliphatic olefin-based monomer, a $C_5$-$C_{20}$ cyclic olefin-based monomer, and a $C_6$-$C_{20}$ aromatic vinyl-based monomer. The monomer may preferably be any one or a mixture of two or more selected from a $C_2$-$C_{10}$ aliphatic olefin-based monomer, a $C_5$-$C_{15}$ cyclic olefin-based monomers and a $C_6$-$C_{10}$ aromatic vinyl-based monomer. The monomer may more preferably be any one or a mixture of two or more selected from a $C_4$-$C_8$ aliphatic olefin-based monomer and a $C_{10}$-$C_{15}$ cyclic olefin-based monomer.

Specific examples of the $C_2$-$C_{20}$ aliphatic olefin-based monomer may include any one or a mixture of two or more selected from piperylene, isoprene, ethylene, propylene, 1-butene, 1-pentene, 1-hexene, 1-heptene, 1-octene, 1-nonene, 1-decene, 3-methyl-1-butene, 4-methyl-1-butene, 2-methyl-2-butene, 3-methyl-1-pentene, 4-methyl-1-pentene, 3-methyl-1-hexene, 4-methyl-1-hexene, 5-methyl-1-hexene, 1,3-hexadiene, 1,4-hexadiene, and mixed $C_5$ fractions. The $C_5$-$C_{20}$ cyclic olefin-based monomer may be any one or a mixture of two or more selected from cyclopentene, cyclohexene, cyclopentadiene and dicyclopentadiene. The $C_6$-$C_{20}$ aromatic vinyl-based monomer may be any one or a mixture of two or more selected from styrene, alpha-methylstyrene, para-methylstyrene, indene, methyl indene, vinyltoluene, and mixed C9 fractions.

The mixed $C_5$ fractions may be composed of a mixture of isoprene, piperylene, cyclopentadiene, 1-pentene, 2-methyl-2-butene and n-pentane. Specifically, the mixed C5 fractions may be composed of 10 to 20 wt % of isoprene, 10 to 20 wt % of piperylene, 0.5 to 1.5 wt % of cyclopentadiene, 2 to 4 wt % of 1-pentene, 1 to 3 wt % of 2-methyl-2-butene, and 25 to 35 wt % of n-pentane. More specifically, most of the C5 fractions used worldwide may be piperylene-concentrated fractions of which piperylene is the main monomer.

The mixed C9 fractions may be composed of a mixture of styrene, vinyltoluene, indene, alpha-methylstyrene, benzene, toluene and xylene (BTX). Specifically, the mixed C9 fractions are may be composed of 10 to 20 wt % of styrene, 10 to 20 wt % of vinyltoluene, 10 to 20 wt % of indene, 1 to 7 wt % of alpha-methylstyrene, and 40 to 60 wt % of xylene.

According to an aspect of the present invention, the monomer may necessarily be a $C_5$-$C_{20}$ cyclic olefin-based monomer. The monomer may preferably be a $C_4$-$C_8$ aliphatic olefin-based monomer and a $C_6$-$C_{10}$ aromatic vinyl-based monomer. The monomer may more preferably be dicyclopentadiene and a $C_4$-$C_8$ aliphatic olefin-based monomer. When the monomer composition is composed of the monomer as described above, it is possible to have a low molecular weight and a low molecular weight distribution with a low softening point and an improved quality, and to realize excellent adhesion. Therefore, the hydrocarbon resin may be used as an adhesive or a pressure-sensitive adhesive.

According to an aspect of the present invention, the monomer composition may be used in a dissolved state in a solvent, and the solvent may be those commonly used in the art to which the present invention pertains. Specific examples of the solvent may include, but are not limited to, any one or a mixture of two or more selected from pentane, hexane, heptane, nonane, decane, benzene, toluene and xylene.

According to an aspect of the present invention, the monomer composition may further include additives commonly used in the art to which the present invention pertains, such as an antioxidant and a polymerization inhibitor.

The hydrocarbon resin according to an aspect of the present invention may be obtained by performing a non-catalytic thermal polymerization on dicyclopentadiene and a comonomer other than dicyclopentadiene, and may satisfy the following Equation 1.

$$0.1 < PDI - 1.45 \times n < 1.3 \quad \text{[Equation 1]}$$

wherein PDI is a polydispersity index of the hydrocarbon resin, and n is a weight ratio of comonomer other than dicyclopentadiene in the monomer composition (weight of comonomer other than dicyclopentadiene/weight of total monomer composition).

In Equation 1, if PDI−1.45×n is z, then the following can be satisfied: $0.1 < z < 1.3$, or $0.3 < z < 1.3$, or $0.5 < z < 1.3$, or $0.5 < z < 1.25$, or $0.8 < z < 1.25$, or $1.0 < z < 1.25$. In the case in which Equation 1 is satisfied, the molecular weight distribution may be narrow, and uniform physical properties may be implemented.

According to an aspect of the present invention, the hydrocarbon resin produced by using a method for producing non-catalytic thermal polymerization hydrocarbon resin according to the present invention, may have a polydispersity index (PDI) of 2.5 or less. The hydrocarbon resin may have a polydispersity index of 1.0 to 2.5, preferably 1.2 to 2.4, more preferably 1.4 to 2.2, and still more preferably 1.4 to 1.8. As described above, when the thermal polymerization is performed under the non-catalytic and non-initiator conditions in two steps by using the method for producing the hydrocarbon resin according to the present invention, the molecular weight distribution may be significantly narrowed.

According to an aspect of the present invention, the hydrocarbon resin may have a number average molecular weight (Mn) of 200 to 1,200 g/mol, a weight average molecular weight (Mw) of 250 to 4,000 g/mol, and a Z-average molecular weight (Mz) of 300 to 5,000 g/mol. The hydrocarbon resin may preferably have a number average molecular weight (Mn) of 250 to 1,000 g/mol, a weight average molecular weight (Mw) of 300 to 3,000 g/mol, and a Z-average molecular weight (Mz) of 350 to 4,000 g/mol. The hydrocarbon resin may more preferably have a number average molecular weight (Mn) of 200 to 800 g/mol, a weight average molecular weight (Mw) of 300 to 3,000 g/mol, and a Z-average molecular weight (Mz) of 400 to 4,000 g/mol.

These characteristics may cause the hydrocarbon resin to be mixed with other polymers to provide a hot-melt tackifier or an adhesive which implements excellent adhesion. In particular, since the hydrocarbon resin may function as a tackifier resin for a polymer having various physical properties, it is expected to be used in various technical fields.

According to an aspect of the present invention, the method may further include, after the step b), a hydrogenation process. The hydrogenation may be performed according to methods known in the art to which the present invention pertains. The hydrogenation is a reaction in which hydrogen is added to an unsaturated double bond to form a single bond, and the hydrocarbon resin is subjected to the hydrogenation to produce a hydrogenated hydrocarbon resin in which all double bonds are eliminated. As a specific example, the hydrogenation may be performed by charging the hydrocarbon resin obtained by a two-step polymerization, which is non-catalytic thermal polymerization, into a continuous hydrogenation reactor packed with a hydrogenation catalyst.

According to an aspect of the present invention, the hydrogenation may be performed at 150 to 300° C. under a pressure of 50 to 150 bar, but is not limited thereto. When the hydrogenation is performed at the pressure and temperature as described above, the molecular structure may be prevented from being destroyed.

According to an aspect of the present invention, the hydrogenation catalyst is not particularly limited, and any of the known hydrogenation catalysts may be used. Specific examples of the hydrogenation catalyst may include any one or a mixture of two or more selected from Ni, Fe, Cu, Co, Mo, Pd, Rh, Pt, Nb, Au, Rd and Raney Ni.

According to an aspect of the present invention, the hydrogenation catalyst may be included in an amount of 0.001 to 0.5 molar ratio, preferably 0.05 to 0.2 molar ratio based on 1 mol of the monomer of the hydrocarbon resin, for improving the reactivity, but is not limited thereto.

According to an aspect of the present invention, the hydrocarbon resin which is subjected to hydrogenation as described above, may be used as a hot-melt adhesive, a pressure-sensitive adhesive, or the like, or may be used as an adhesive by blending with various resins such as natural rubber or synthetic rubber. The hydrocarbon resin which is subjected to the hydrogenation may also be added to ink, paint, paint for road marking, or the like as a tackifier or adhesive resin.

The hydrocarbon resin subjected to the hydrogenation may be provided as an adhesive composition by further including any one or a mixed copolymer of two or more selected from styrene-based copolymers such as styrene-isoprene copolymers, styrene-isoprene-styrene copolymers, styrene-butadiene copolymers, styrene-butadiene-styrene copolymers, or the like, polyolefin-based polymers such as polyethylene, polypropylene, ethylene vinyl acetate, propylene-ethylene copolymers, or the like; and any one or a mixture of two or more selected from synthetic waxes or animal natural waxes such as paraffin waxes, microcrystalline waxes, or the like, vegetable natural waxes, aromatic oils, naphthenic oils, and paraffinic oils in the hydrocarbon resin for use as an adhesive.

According to an aspect of the present invention, even if the thus produced hydrogenated hydrocarbon resin is made of an adhesive composition, the low molecular weight organic substance may be released to the surface, thereby preventing contamination of a bonding surface or contamination of surroundings over time.

According to an aspect of the present invention, after curing, the adhesive composition may have a softening point of 50 to 150° C., preferably 100 to 150° C., and more preferably 105 to 140° C. When the adhesive composition has the softening point as described above, adhesiveness may be improved.

According to an aspect of the present invention, the adhesive composition may have a peel strength at 180° of 1.0 kgf/25 mm or more after curing. The adhesive composition may preferably have the peel strength at 180° of 1.05 kgf/25 mm or more. Specifically, the adhesive composition may have the peel strength at 180° of 1.0 to 2.0 kgf/25 mm, and preferably 1.0 to 2.0 kgf/25 mm. In addition, the adhesive composition may have a tack force of 1.5 kgf or more, and preferably 1.6 kgf or more. Specifically, the adhesive composition may have a tack force of 1.5 to 3.0 kgf and preferably 1.6 to 3.0 kgf.

When the adhesive composition has physical properties as described above, an adhesive having excellent loop tack and peel properties may be provided.

Hereinafter, the present invention will be described in detail with reference to the embodiments. However, they are for the purpose of describing the present invention in more detail, but the scope of the present invention is not limited to the following Examples.

In addition, the unit of the additives may be % by weight, unless otherwise described herein.

[Measurement Method of Physical Properties]

1. Molecular Weight

The weight average molecular weight (Mw), the Z-average molecular weight (Mz), and the number average molecular weight (Mn) in terms of polystyrene were measured by gel permeation chromatography (GPC) (Infinity1260). The dicyclopentadiene based resin to be measured was dissolved in tetrahydrofuran so as to have a concentration of 0.05 wt %, and 10 µl of the dissolved resin was injected into the GPC. The mobile phase of the GPC was injected at a flow rate of 1 mL/min using tetrahydrofuran, and analysis was performed at 35° C. One guard column was connected in series with a PL gel column (5 µm, 50 Å), a PL gel column (5 µm, 100 Å), and an oligopore column (300 Å). The molecular weigh was measured at 35° C. using a refractive detector (RID) as a detector.

2. Softening Point

The softening point was measured using a ring and ball softening method (ASTM E 28). The resin was melted and put into a ring-shape mold to stand in a beaker charged with glycerin. Then, the ball was placed on a ring charged with resins and the temperature was raised by 2.5° C./minute to measure a temperature (softening point) at which the resin melts and the ball drops.

Example 1

750 g of dicyclopentadiene and 750 g of piperylene were mixed in 1,500 g of a xylene solvent to prepare a monomer composition. A primary polymer was produced by reacting the monomer composition while continuously supplying the monomer composition into a continuous stirred tank reactor (CSTR) having an internal volume of 0.416 L with stirring under the conditions of a temperature of 260° C. and a pressure of 25 bar for 42 minutes.

The primary polymer thus produced was polymerized under the conditions of a temperature of 270° C. and a pressure of 25 bar for 63 minutes, while continuously supplying the primary polymer into a plug flow reactor (PFR) having an internal volume of 0.590 L connected to the continuous stirred tank reactor. A product in which polymerization was completed was depressurized at 200° C. for 30 minutes to recover a dicyclopentadiene based resin.

Example 2

1,050 g of dicyclopentadiene and 450 g of piperylene were mixed in 1,500 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 36 minutes.

The primary polymer thus produced was polymerized under the conditions of a temperature of 270° C. and a pressure of 25 bar for 54 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene based resin.

Example 3

450 g of dicyclopentadiene and 1,050 g of piperylene were mixed in 1,500 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 42 minutes.

The primary polymer thus produced was polymerized under the conditions of a temperature of 270° C. and a pressure of 25 bar for 63 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene based resin.

Example 4

The present Example was carried out in the same manner as in Example 1, except that the reaction temperature in the plug flow reactor was 260° C.

Example 5

The present Example was carried out in the same manner as in Example 1, except that the reaction temperature in the continuous stirred tank reactor was 270° C.

Example 6

The present Example was carried out in the same manner as in Example 1, except that the reaction temperatures in the continuous stirred tank reactor and the plug flow reactor were 270° C., respectively.

Example 7

The present Example was carried out in the same manner as in Example 2, except that the reaction temperature in the plug flow reactor was 260° C.

Example 8

750 g of dicyclopentadiene, 400 g of piperylene, and 350 g of styrene were mixed in 1,500 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 40 minutes.

The primary polymer thus produced was polymerized under the conditions of a temperature of 270° C. and a pressure of 25 bar for 60 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene based resin.

Example 9

750 g of dicyclopentadiene and 750 g of 1-hexene were mixed in 1,500 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 40 minutes.

The primary polymer thus produced was polymerized under the conditions of a temperature of 270° C. and a pressure of 25 bar for 60 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene based resin.

The primary polymer thus produced was polymerized under the conditions of a temperature of 270° C. and a pressure of 25 bar for 60 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene based resin.

Comparative Example 1

750 g of dicyclopentadiene and 750 g of piperylene were mixed in 1,500 g of a xylene solvent to prepare a monomer composition. A primary polymer was produced by reacting the monomer composition while continuously supplying the monomer composition into the plug flow reactor having an internal volume of 0.295 L with stirring under the conditions of a temperature of 260° C. and a pressure of 25 bar for 52 minutes.

The primary polymer thus produced was polymerized under the conditions of a temperature of 270° C. and a pressure of 25 bar for 53 minutes, while continuously supplying the primary polymer into the plug flow reactor having the same internal volume of 0.295 L connected to the plug flow reactor. A product in which polymerization was completed was depressurized at 200° C. for 30 minutes to recover a dicyclopentadiene based resin.

Comparative Example 2

1,050 g of dicyclopentadiene and 450 g of piperylene were mixed in 1,500 g of a xylene solvent to prepare a monomer composition. A primary polymer was produced by reacting the monomer composition while continuously supplying the monomer composition into the plug flow reactor having an internal volume of 0.295 L with stirring under conditions of a temperature of 260° C. and a pressure of 25 bar for 45 minutes.

The primary polymer thus produced was polymerized under the conditions of a temperature of 270° C. and a pressure of 25 bar for 45 minutes, while continuously supplying the primary polymer into the plug flow reactor having the same internal volume of 0.295 L connected to the plug flow reactor. A product in which polymerization was completed was depressurized at 200° C. for 30 minutes to recover a dicyclopentadiene based resin.

Comparative Example 3

1,050 g of dicyclopentadiene and 450 g of piperylene were mixed in 1,500 g of a xylene solvent to produce a monomer composition. A primary polymer was produced by reacting the monomer composition while continuously supplying the monomer composition into the plug flow reactor having an internal volume of 0.295 L with stirring under conditions of a temperature of 260° C. and a pressure of 25 bar for 40 minutes.

The primary polymer thus produced was polymerized under the conditions of a temperature of 270° C. and a pressure of 25 bar for 45 minutes, while continuously supplying the primary polymer into the plug flow reactor having the same internal volume of 0.295 L connected to the plug flow reactor. A product in which polymerization was completed was depressurized at 200° C. for 30 minutes to recover a dicyclopentadiene based resin.

Comparative Example 4

450 g of dicyclopentadiene and 1050 g of piperylene were mixed in 1,500 g of a xylene solvent to prepare a monomer composition. A primary polymer was produced by reacting the monomer composition while continuously supplying the monomer composition into the plug flow reactor having an internal volume of 0.295 L with stirring under conditions of a temperature of 260° C. and a pressure of 25 bar for 40 minutes.

The primary polymer thus produced was polymerized under the conditions of a temperature of 270° C. and a pressure of 25 bar for 45 minutes, while continuously supplying the primary polymer into the plug flow reactor having the same internal volume of 0.295 L connected to the plug flow reactor. A product in which polymerization was completed was depressurized at 200° C. for 30 minutes to recover a dicyclopentadiene based resin.

Comparative Example 5

750 g of dicyclopentadiene and 750 g of piperylene were mixed in 1,500 g of a xylene solvent to prepare a monomer composition. A primary polymer was produced by reacting the monomer composition while continuously supplying the monomer composition into the continuous stirred tank reactor having an internal volume of 0.416 L with stirring under conditions of a temperature of 260° C. and a pressure of 25 bar for 48 minutes.

The primary polymer thus produced was polymerized under the conditions of a temperature of 270° C. and a pressure of 25 bar for 72 minutes, while continuously supplying the primary polymer into the continuous stirred tank reactor having the same internal volume of 0.416 L connected to the continuous stirred tank reactor. A product in which polymerization was completed was depressurized at 200° C. for 30 minutes to recover a dicyclopentadiene based resin.

Comparative Example 6

750 g of dicyclopentadiene and 750 g of piperylene were mixed in 1,500 g of a xylene solvent to prepare a monomer composition. A primary polymer was produced by reacting the monomer composition while continuously supplying the monomer composition into the continuous stirred tank reactor having an internal volume of 0.416 L with stirring under conditions of a temperature of 260° C. and a pressure of 25 bar for 45 minutes.

The primary polymer thus produced was polymerized under the conditions of a temperature of 270° C. and a pressure of 25 bar for 45 minutes, while continuously supplying the primary polymer into the continuous stirred tank reactor having the same internal volume of 0.416 L connected to the continuous stirred tank reactor. A product in which polymerization was completed was depressurized at 200° C. for 30 minutes to recover a dicyclopentadiene based resin.

The reaction conditions of the Examples and Comparative Examples are shown in the following Table 1.

TABLE 1

| | Reaction condition of first step | | Reaction condition of second step | | |
|---|---|---|---|---|---|
| | Reactor | Reaction temperature and time | Reactor | Reaction temperature and time | Weight ratio (n) of comonomer |
| Example 1 | CSTR | 260° C., 42 min | PFR | 270° C., 63 min | 0.5 |
| Example 2 | CSTR | 260° C., 36 min | PFR | 270° C., 54 min | 0.3 |
| Example 3 | CSTR | 260° C., 42 min | PFR | 270° C., 63 min | 0.7 |
| Example 4 | CSTR | 260° C., 42 min | PFR | 260° C., 63 min | 0.5 |
| Example 5 | CSTR | 270° C., 42 min | PFR | 260° C., 63 min | 0.5 |
| Example 6 | CSTR | 270° C. 42 min | PFR | 270° C., 63 min | 0.5 |
| Example 7 | CSTR | 260° C., 36 min | PFR | 260° C., 54 min | 0.3 |
| Example 8 | CSTR | 260° C., 40 min | PFR | 270° C., 60 min | 0.5 |
| Example 9 | CSTR | 260° C., 42 min | PFR | 270° C., 63 min | 0.5 |
| Comparative Example 1 | PFR | 260° C., 52 min | PFR | 270° C., 53 min | 0.5 |
| Comparative Example 2 | PFR | 260° C., 45 min | PFR | 270° C., 45 min | 0.3 |
| Comparative Example 3 | PFR | 260° C., 4 0 min | PFR | 270° C., 4 0 min | 0.3 |
| Comparative Example 4 | PFR | 260° C., 45 min | PFR | 270° C., 45 min | 0.7 |
| Comparative Example 5 | CSTR | 260° C., 48 min | CSTR | 270° C., 72 min | 0.5 |
| Comparative Example 6 | CSTR | 260° C., 45 min | CSTR | 270° C., 45 min | 0.2 |

EXPERIMENTAL EXAMPLE

The molecular weights (Mn, Mw, Mz) and the polydispersity index (PDI, Mw/Mn) of the dicyclopentadiene based resin produced from the Examples and the Comparative Examples were measured and are shown in the following Table 2.

TABLE 2

| | Mw (g/mol) | Mn (g/mol) | Mz (g/mol) | PDI | Weight ratio (n) of comonomer | PDI − 1.45 × n | Yield (%) |
|---|---|---|---|---|---|---|---|
| Example 1 | 906 | 511 | 2,000 | 1.77 | 0.5 | 1.045 | 73 |
| Example 2 | 612 | 387 | 1,284 | 1.58 | 0.3 | 1.145 | 66 |
| Example 3 | 1,295 | 647 | 3,022 | 2.00 | 0.7 | 0.985 | 74 |
| Example 4 | 944 | 568 | 2,129 | 1.66 | 0.5 | 0.935 | 65 |
| Example 5 | 812 | 527 | 1,744 | 1.54 | 0.5 | 0.815 | 65 |
| Example 6 | 929 | 619 | 1,823 | 1.50 | 0.5 | 0.775 | 69 |
| Example 7 | 573 | 355 | 1,389 | 1.61 | 0.3 | 1.175 | 62 |
| Example 8 | 994 | 561 | 2,111 | 1.78 | 0.5 | 1.055 | 70 |
| Example 9 | 925 | 540 | 2,033 | 1.71 | 0.5 | 0.985 | 60 |
| Comparative Example 1 | 1,171 | 552 | 3,977 | 2.12 | 0.5 | 1.395 | 72 |
| Comparative Example 2 | 699 | 392 | 1,998 | 2.02 | 0.3 | 1.585 | 59 |
| Comparative Example 3 | 704 | 348 | 1,916 | 2.01 | 0.3 | 1.575 | 57 |
| Comparative Example 4 | 2,086 | 690 | 7,113 | 3.02 | 0.7 | 2.005 | 59 |
| Comparative Example 5 | 911 | 453 | 2,257 | 2.11 | 0.5 | 1.385 | 58 |
| Comparative Example 6 | 486 | 298 | 1,279 | 2.00 | 0.2 | 1.710 | 55 |

As shown in Table 2, it was confirmed that the hydrocarbon resin according to the Examples of the present invention has a significantly higher yield and narrower molecular weight distribution as compared to the Comparative Examples having the same weight ratio of the comonomer.

Furthermore, for Comparative Examples 1 to 6, it was confirmed that the molecular weight distribution was broad and the yield was also low by setting the reactor configurations in the primary and secondary polymerization to be the same. Thus, it was confirmed that the reactor was configured differently during the primary and secondary polymerization, and during the primary polymerization, the polymerization was performed while stirring in the continuous stirred tank reactor and during the secondary polymerization, the polymerization was performed in the plug flow reactor, thereby implementing an excellent yield and narrow molecular weight distribution of the hydrocarbon resin.

Moreover, it was confirmed that the hydrocarbon resin produced by the production method according to the embodiment of the present invention may be subjected to the thermal polymerization under the non-catalytic conditions, thereby having the narrow molecular weight distribution and implementing uniform physical properties.

Example 10

The hydrogenation was performed twice under conditions of a temperature of 260° C. and a pressure of 100 bar using 0.5 wt % of palladium catalyst based on the total weight of the dicyclopentadiene based resin in Example 1 and 4 NL/min of hydrogen.

Comparative Example 7

The dicyclopentadiene based resin in Comparative Example 1 was subjected to the hydrogenation in the same manner as in Example 8.

Comparative Example 8

The dicyclopentadiene based resin in Comparative Example 5 was subjected to the hydrogenation in the same manner as in Example 8.

In order to evaluate adhesion of the dicyclopentadiene based hydrogenated resin produced from Example 10, and Comparative Examples 7 and 8, the adhesive composition was produced by adding 25 parts by weight of styrene-butadiene-styrene copolymers, 57 parts by weight of a dicyclopentadiene based hydrogenated resin, 18 parts by weight of a paraffin oil plasticizer, and 0.5 parts by weight of an antioxidant.

The adhesive composition thus produced was applied to a 100 μm PET film whose cross section was corona treated at a wet thickness of 36 μl using an automatic film applicator. The applied film was dried at 100° C. for 30 minutes to remove the solvent, and a peel strength at 180° and a loop tack test were measured using an FT-1 universal material testing machine (manufactured by LLOYD). The results are shown in Table 3.

TABLE 3

| | Peel strength at 180° (kgf/25 mm) | Tack force (kgf) | Softening point (° C.) |
|---|---|---|---|
| Example 10 | 1.11 | 1.63 | 112 |
| Comparative Example 7 | 0.95 | 1.23 | 109 |
| Comparative Example 8 | 1.04 | 1.44 | 107 |

As shown in Table 3, it was confirmed that the dicyclopentadiene based hydrogenated resin in Example 10 has a significantly improved peel strength and a tack force as compared to the hydrogenated resin produced as the Comparative Examples, thereby having excellent adhesion.

In addition, it was confirmed that the dicyclopentadiene based hydrogenated resin in Example 10 did not cause contamination of the bonding surface or contamination of surrounding devices, even with an increase in implementation with long-term use, and thus exhibited excellent adhesion and holding ability over a long period of time.

The present invention described above is only an example, and it may be appreciated by those skilled in the art to which the present invention pertains that various modifications and equivalent other exemplary embodiments may be made from the exemplary embodiment. It may be thus understood well that the present invention is not limited to only a form mentioned in the above detailed description. Accordingly, the true scope of technical protection of the present invention is to be determined by the technical spirit of the appended claims.

Therefore, the spirit of the present invention should not be limited to the above-mentioned exemplary embodiments, but the claims and all of the modifications equal or equivalent to the claims are intended to fall within the scopes and spirits of the present invention.

The invention claimed is:

1. A method for producing a hydrocarbon resin, the method comprising:
   a) a step of performing a primary thermal polymerization to produce a primary polymer in a continuous stirred tank reactor (CSTR) under non-catalytic conditions; and
   b) a step of subjecting the primary polymer to a secondary thermal polymerization to produce the hydrocarbon resin in a plug flow reactor (PFR) under non-catalytic conditions.

2. The method of claim 1, wherein
   a reaction temperature (T1) in the step a) is 210 to 270° C., and
   a reaction temperature (T2) in the step b) is 180 to 300° C.

3. The method of claim 2, wherein the reaction temperature (T2) in the step b) is the reaction temperature (T1) in the step a) ±30°.

4. The method of claim 1, wherein
   a reaction time in the step a) is 10 to 180 minutes, and
   a reaction time in the step b) is 10 to 360 minutes.

5. The method of claim 1, wherein an internal volume of the plug flow reactor is 1 to 3 times the internal volume of the continuous stirred tank reactor.

6. The method of claim 1, wherein the plug flow reactor is connected in series with the continuous stirred tank reactor.

7. The method of claim 1, wherein the hydrocarbon resin has a polydispersity index (PDI) of 2.5 or less.

8. The method of claim 1, further comprising, after the step b), performing a hydrogenation process.

9. A hydrocarbon resin produced by the method of claim 1.

10. The hydrocarbon resin of claim 9, wherein the hydrocarbon resin has a number average molecular weight of 200 to 1,200 g/mol, a weight average molecular weight of 250 to 4,000 g/mol, and a Z-average molecular weight (Mz) of 300 to 5,000 g/mol.

11. The hydrocarbon resin of claim 9, wherein the hydrocarbon resin has a polydispersity index (PDI) of 2.5 or less.

* * * * *